No. 716,971. Patented Dec. 30, 1902.
E. WESTON.
ELECTRICAL MEASURING INSTRUMENT
(Application filed May 7, 1902.)
(No Model.) 4 Sheets—Sheet 1.

Fig. 1.

No. 716,971. Patented Dec. 30, 1902.
E. WESTON.
ELECTRICAL MEASURING INSTRUMENT.
(Application filed May 7, 1902.)
(No Model.) 4 Sheets—Sheet 3.

No. 716,971. Patented Dec. 30, 1902.
E. WESTON.
ELECTRICAL MEASURING INSTRUMENT.
(Application filed May 7, 1902.)
(No Model.) 4 Sheets—Sheet 4.

Witnesses
Edward Rowland
M. F. Keating

Inventor
Edward Weston
By his Attorney
Charles J. Kintner

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 716,971, dated December 30, 1902.

Application filed May 7, 1902. Serial No. 106,242. (No model.)

*To all whom it may concern:*

Be it known that I, EDWARD WESTON, a subject of the King of Great Britain, residing at Newark, in the county of Essex and State of New Jersey, have made a new and useful Invention in Electrical Measuring Instruments, of which the following is a specification.

My invention is directed particularly to improvements in portable electrical measuring instruments—such, for instance, as are disclosed in numerous United States patents heretofore granted to me and especially the instruments described in Patents Nos. 392,386 and 392,387, of November 6, 1888, and No. 611,722, of October 4, 1898; and it has for its objects, first, to cheapen and simplify the construction of such instruments by minimizing the number of parts used; second, to provide a portable electrical measuring instrument in which the major portion of the operative parts thereof shall be compactly held within the retaining-casing by the binding action thereof and the binding action of the interconnected parts themselves; third, to provide novel means for supporting the movable coil, the core, and the attached parts in such manner that the same may always maintain a fixed relation to the polls of the field-magnet of the instrument and that said movable coil, core, and parts, together with their support, may be removed as a unit from the instrument without disturbing the pivots or pivot-bearings of the coil; fourth, to provide novel means for centering and steadying the field-magnet within the casing of the instrument and in such manner that the relations between the field-poles thereof and the movable coil in the field thereof shall always be constant; fifth, to provide an electrical measuring instrument with a sharp-pointed contacting terminal and a binding screw or nut so constructed and arranged that when the instrument is not in actual use or when being transported the binding screw or nut may be so adjusted as to protect the point of the terminal from injury; sixth, to construct an electrical measuring instrument having all of the essential details illustrated in the accompanying drawings and described in the following specification, the especial points of novelty of my invention being particularly pointed out in the claims at the end of the specification.

For a full and clear understanding of the invention, such as will enable others skilled in the art to construct and use the same, reference is had to the accompanying drawings, in which—

In the instruments disclosed in my prior patents, hereinbefore referred to, the movable coil, the magnetizable core which said coil surrounds, and the pivots and pivot-bearings are all secured to the permanent field-magnet between the poles thereof by independent detachable non-magnetic bars and bridges held together by a number of screws, and the permanent magnet, constituting the field-magnet, is secured to the casing of the instrument also by screws, and the soft-iron pole-pieces, constituting the magnetic field, are secured to the poles of the magnet in the same manner.

My present invention does away with the soft-iron pole-pieces and contemplates an improvement upon this manner of supporting the movable coil, the core, and the pivot-bearings to the extent that I avoid the use of so many screws and am also enabled to construct the instrument in such manner that the axial relation of the coil and its pivots to the air-space between the field-magnet poles and the core shall be more definite and exact than was possible with the means utilized in the before-mentioned instruments in that I construct the core-support of a single piece of non-magnetic metal, secure the core therein from one side by a single screw, and provide a single bridge at the upper end of the core-support for the upper jewel-bearing of the coil, the lower jewel-bearing being secured in the lower end of the before-mentioned core-support. This entire assemblage of parts, which I term the "movement," is secured frictionally directly between the poles of the permanent field-magnet. I also further simplify the structural apparatus in that I do away with the screws for securing the field-magnet to the casing and utilize steady-pins accurately centered with relation to the inner part of the casing and so combine the field-magnet as thus centered with the core-support and the casing that the entire structure is effectually bound together by the detachable part of the casing and the clamping action of the parts upon each other.

My invention comprehends also novel means for securing the movement, embracing the core, the movable coil, and attached parts, to the magnet. By long experience I have found that where permanent magnets are bent into either cylindrical or horseshoe shape and holes drilled therein for securing the same to the casing or for securing the parts of the instrument thereto and the magnets afterward hardened a number of serious defects result. Oftentimes the magnets will warp, thus varying the position of the holes, so that they will not bear a definite relation to the supports to which they are to be secured. After such magnets are hardened holes of this nature cannot be drilled therein without damage to the drilling-tools. In view of these facts I have devised novel means for effecting the result sought. To this end I drill relatively large holes at the desired points in one face of the magnet for the supports thereof and similarly relatively large holes in the other face and near the poles thereof for furnishing supports for the movement. I then drive or force soft material into these holes, preferably iron, so that the material and the magnet are in effect integral after it is thus embedded. Any relatively soft material as compared to the magnet itself—such as lead, nickel, brass, or the like—or even an insulating material, such as hard rubber, may be used instead of iron. After the magnets are hardened and ready for use I drill holes in these soft masses at the proper points to correspond with the supports in the casing and in like manner drill holes in the soft masses near the poles of the magnet and on the other face thereof for the supports for the movement. Inasmuch as these soft masses of material have a relatively large area it is possible to drill holes for the centering-pins and for the supports for the movement having a definite relation to the parts to be supported, so that I am enabled to construct a perfect permanent field-magnet with supporting means, which magnet is not liable to crack or not subjected to other damaging defects.

Figure 1:
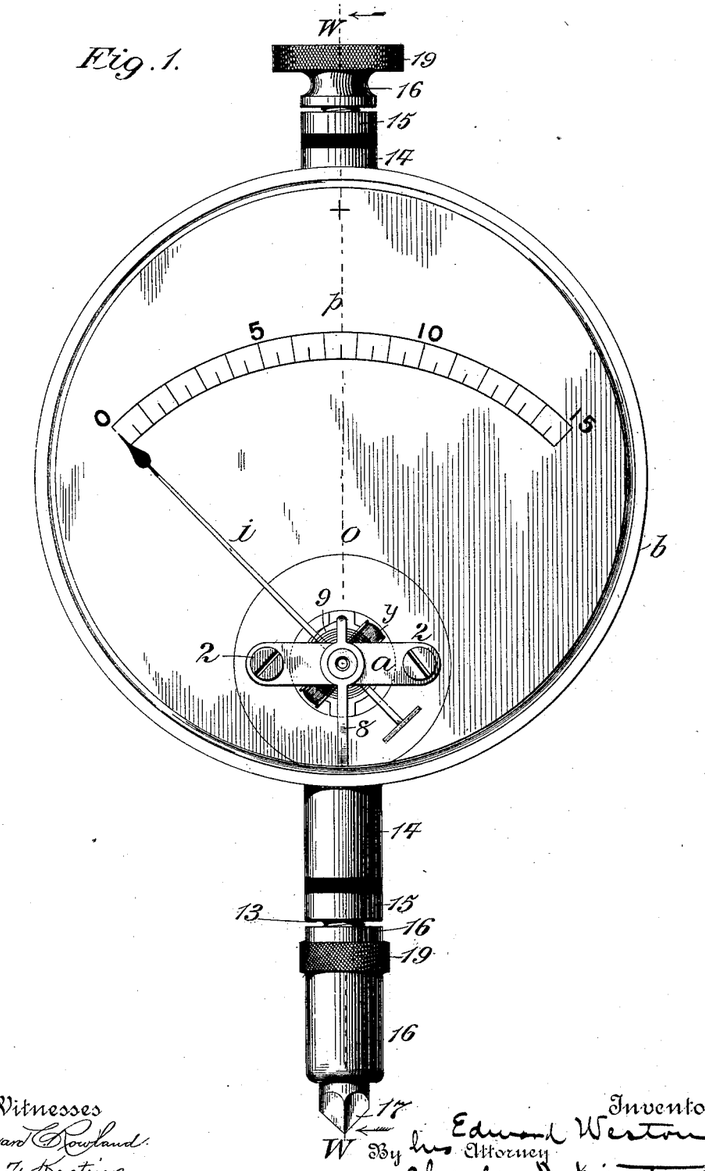
Figure 1 is an enlarged plan view of my novel electrical measuring instrument, illustrated as a voltmeter.
Figure 2:
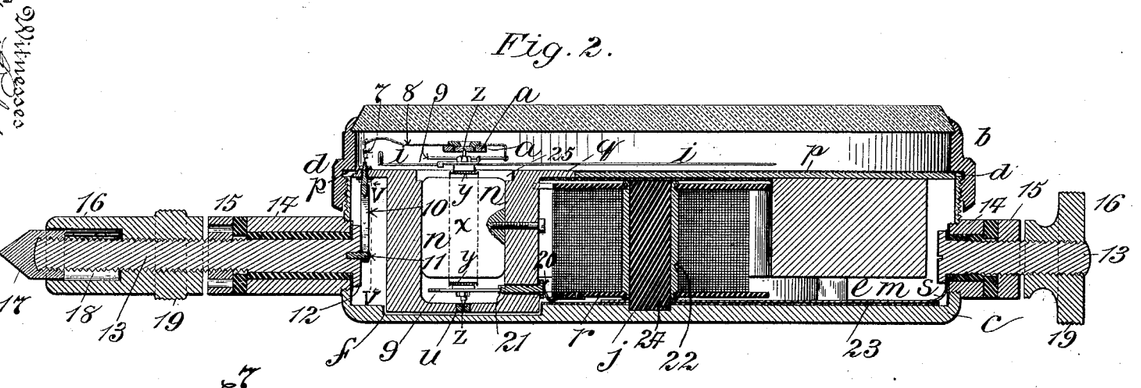
Fig. 2 is a sectional view taken through Fig. 1 on the line W W and as seen looking thereat from right to left in the direction of the arrows.

Referring now to the drawings in detail and first to Figs. 1 and 2, $c$ represents the lower or containing casing of the instrument, made, preferably, of some non-magnetic metal, as brass, and of cylindrical shape.

$b$ represents the screw-threaded removable top or cover, also cylindrical in shape, and carrying the usual heavy glass plate in its upper face resembling in general structure the bezel of a watch, $d$ being an internally-projecting ledge or shoulder, the function of which will be described later on.

13 13 are the conducting-terminals of the instrument consisting of screws provided with heads located within the casing of the instrument, the threaded portions thereof extending outward, as shown.

14 14 are sleeves screw-threaded into the casing and supporting the terminals 13 13, insulating-sleeves being provided between said terminals and the sleeves.

15 15 are nuts for firmly securing or holding the terminals in place, insulating-washers being provided between said nuts and the outer ends of the sleeves 14 14, additional insulating-washers being located between the inner heads of the terminals 13 13 and the casing of the instrument, and the entire arrangement such that when the nuts 15 15 are screwed firmly home the terminals 13 13 are rigidly secured to the casing of the instrument and insulated therefrom.

16 16 are the binding-screws, each provided with a milled head 19.

17 is a sharp-pointed terminal secured by a screw-thread to the outer end of one of the terminals 13 and adapted to be concealed or covered by a pocket 18 in the outer end of the cylindrical-shaped binding-screw 16, when the latter is moved away from its contact with the nut 15. This sharp-pointed terminal has an especial function in connection with the use of the instrument for testing storage or other batteries where it is desirable to make good metallic contact with the lead or other conducting terminals thereof, the sharp point making it possible to quickly make an actual conducting-contact and the hollow binding-screw acting as a protector therefor.

$m$ is the permanent field-magnet, made, preferably, cylindrical in form, as shown, and $x$ is the cylindrical magnetizable core located within the movable coil $y$ and similar to the corresponding magnetizable core disclosed in my before-mentioned patents.

Figure 9:
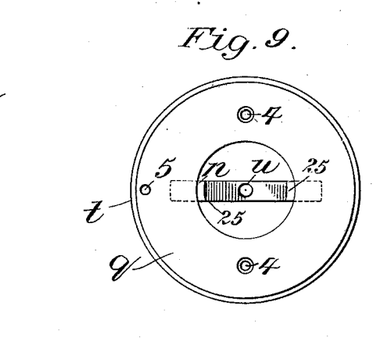
Fig. 9 is a plan view of the core-support.
Figure 10:
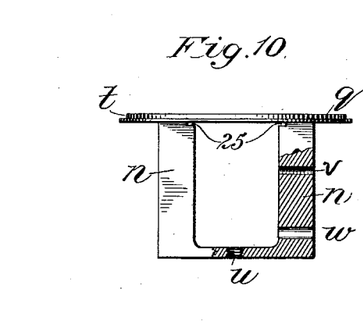
Fig. 10 is a side elevational view of the same as seen looking at Fig. 9 from the bottom toward the top of the drawing, the lower right-hand portion being broken away to better illustrate the manner of fastening the core when definitely located and illustrating also the lower pivot-bearing and a hole for the conductor which conveys the current from the resistance-coil to the lower coiled spring of the movable coil.

$q$ is the core-support, which is in the present instance constructed of a single integral piece of non-magnetic metal preferably turned so as to have a flat disk-like upper surface with an outer ledge $t$ and U-shaped downwardly-extending limbs $n\,n$, in the bottom or interconnecting portion of which is located an opening $u$ for receiving the lower jewel-bearing $z$, upon which rests the lower pivot-pin of the movable coil $y$. The core-support is turned in a lathe from a single piece of non-magnetic metal, as brass, and when thus completed in the lathe it is in the nature of a cylindrical cup with the flange and the enlarged opening 25 at the open end thereof. The opposite faces of the cylindrical cup are then dressed down in a planer so as to leave only the two downwardly-extending limbs $n\,n$ and their integral connection, as clearly shown in Figs. 9 and 10. Cross-sections of the inner faces of the limbs $n\,n$ are arcs of a circle adapted to fit the core $x$, and 25 is an enlarged opening in the upper end of the support for receiving the movable coil. $v$ is a screw-hole in one of the limbs $n$ for securing the magnetizable core $x$ thereto from vertical movement, and $w$ is an opening adapted to receive a conducting-plug 21, which plug is surrounded by an insulating-sleeve and electrically connected to the lower coiled spring 9 of the movable coil $y$.

Figures 4, 5, 6, 7:
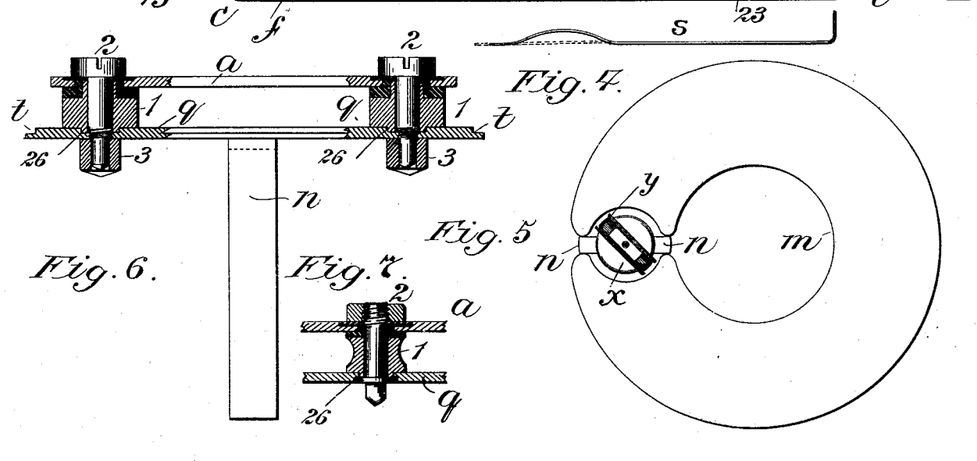
Fig. 4 is a detail view of the conducting-spring, which joins one of the terminals to the resistance-coil of the instrument.
Fig. 5 is a plan view of the permanent field-magnet, the movable coil, the core, and core-support.
Fig. 6 is an enlarged sectional view taken through the flange of the core-support and through the ends of the bridge which supports the upper pivot-bearing of the coil, the soft-metal masses which secure these parts to the permanent field-magnet being also shown in section.
Fig. 7 is a detail sectional view of a modified means for securing the bridge in mechanical connection with the core-support.
Figure 8:
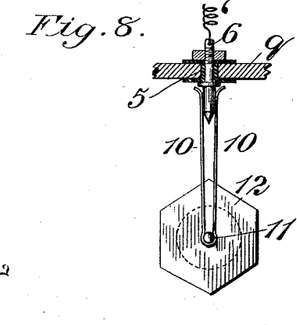
Fig. 8 is a detail sectional view taken on the line V V, Fig. 2, and as seen looking thereat from right to left.

The core-support is shown in enlarged view in Fig. 6, in which the details of the bridge or support $a$ for the upper jewel-bearing $z$ are more clearly indicated, 1 1 being sleeves and 2 2 studs or pins adapted to extend therethrough and to secure the bridge or support firmly to the upper part of the core-support $q$ in the manner shown, said bridge being effectually insulated, as shown, from the core-support. The sleeves 1 1 are accurately turned down and have trued extensions 26, fitting in accurately spaced and turned recesses in the face of the core-support $q$, said recesses being mathematically located with relation to the axis of the magnetizable core when secured in place in the core-support.

3 3 are soft plugs embedded in relatively large holes 4 4 in the upper faces of the poles of the field-magnet $m$, as will be set forth more particularly when the manner of assembling the parts of the entire instrument is described. These several parts just described are constructed and fitted together with mathematical nicety to insure the best results.

8 is a movable abutment secured to the bridge or support $a$ and to the free end of the upper coiled conducting-spring 9, said abutment and spring being substantially like the similar parts disclosed in my before-mentioned patents. To the free end of the movable abutment 8 is connected a conducting-spring 7, which in turn is connected to a downwardly-extending screw-threaded plug 6, secured in a hole or opening 5 in one edge of the flange of the core-support $q$ and insulated therefrom, so that the free end of said plug is adapted when slipped into position to make good electrical contact between the yielding ends of a double-leaf spring 10, connected in turn to a conducting-plug 11 in the inner end of the head 12 of the terminal 13.

$i$ is the index-needle, secured directly to the movable coil and adapted to move therewith.

$r$ is the resistance-coil, the external diameter of the heads of its spool fitting snugly within the inner cylindrical portion of the field-magnet $m$.

22 is the sustaining-core of the coil, which is shown in Fig. 2 as made of conducting material and to which one end of the coil is connected, the other end of said coil being connected, as shown, by a conducting-spring 20, to the head of the plug 21.

24 is an interior locking-core for the coil, made of insulating material and adapted to rest when the coil is in position with its lower end fitting snugly within a cylindrical centering depression $j$ in the bottom of the central portion of the casing. $f$ is a similar but larger centering depression for receiving and locking the lower end of the core-support $q$. (See also Figs. 11 and 12.)

$s$ is a flat leaf-spring having an upturned end provided with a hole or opening adapted to secure the spring in good metallic contact with one of the terminals 13 when the latter is in place. The free end of this spring is normally curved slightly upward, as shown in Fig. 4, and is adapted when all of the parts of the instrument are assembled and locked together to make good metallic contact with the metallic core 22.

$e$ is a cylindrical ledge preferably integral with the interior of the casing, said ledge being provided in its upper surface with two or more centering-holes $h\ h$. (See Fig. 11.)

$p$ is the dial-plate, provided with an opening $o$, adapted to fit snugly around the ledge $t$ of the upper end of the core-support $q$, a slot being provided at one side of the dial-plate, the function of which will be pointed out in connection with the description of the manner of assembling the parts of the entire instrument. This dial-plate also has a locking-ledge, as shown in dotted lines in Fig. 17, its function being to lock or secure it to the similar ledge $t$ at the top of the core-support.

Figures 11, 12, 13, 14, 15:
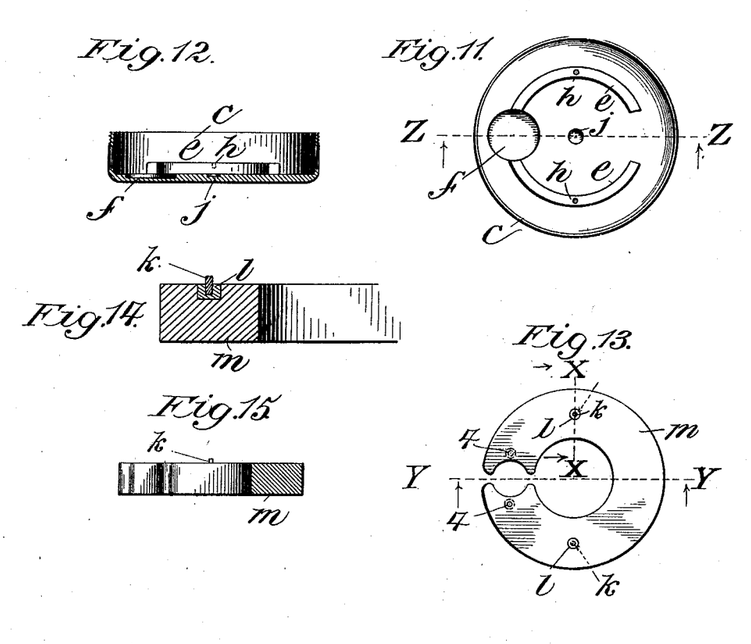
Fig. 11 is an interior view of the bottom of the casing.
Fig. 12 is a sectional view of the same, taken on the line Z Z, Fig. 11, and as seen looking from the bottom toward the top of the drawing in the direction of the arrows.
Fig. 13 is a plan view of the permanent field-magnet, illustrating also the manner of securing the steady-pins in the lower face thereof and in the holes or openings in the upper face thereof for securing the core-support thereto.
Fig. 14 is an enlarged sectional view taken through Fig. 13 on the line X X and as seen looking thereat from left to right in the direction of the arrows, said view illustrating the manner of securing the steady-pins to the magnet in soft masses embedded therein.
Fig. 15 is a sectional view taken through Fig. 13 on the line Y Y and as seen looking thereat from the bottom toward the top of the drawings.
Figures 16, 17:
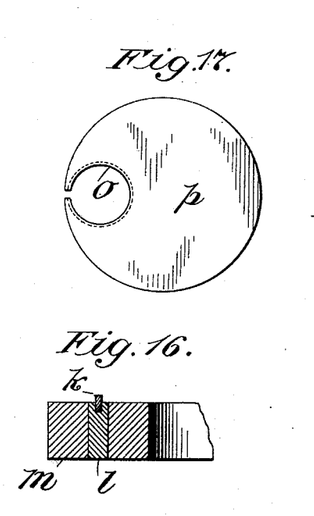
Fig. 16 is an enlarged sectional view similar to Fig. 14, illustrating a modified manner of supporting the steady-pins in soft masses embedded in the field-magnet.
Fig. 17 is a plan view of the dial-plate.

Referring now to Figs. 13 to 16, inclusive, I will describe the manner of providing means for supporting the permanent magnet in place within the casing and for securing the movement to said magnet. After the magnet has been given its form as seen in Figs. 13 and 15 holes or openings are drilled in one face thereof of sufficient diameter to receive soft plugs, preferably of magnetic metal. These plugs are driven firmly home, so as to become practically integral parts of the magnet. Similar plugs 3 3 are driven into the opposite face in like holes or openings 4 4. The magnet is then heated and subjected to the usual treatment for hardening and tempering. Properly-spaced holes are then drilled in the soft plugs $l\ l$ and steady or centering pins $k\ k$, screws, or other means of support inserted therein. Holes are drilled in the corresponding plugs 3 3, and said plugs are inserted in the holes 4 4 near the poles of the magnet and on the opposite face thereof for the purpose of receiving the studs or pins 2 2, which bind the bridge and bridge-supports firmly to the core-support. In Fig. 16 I have shown a slightly-modified form of this feature of the invention in which the metallic plug $l$ extends entirely through the magnet, thereby adapting it to be drilled and provided with centering-pins on opposite sides or on either side, as preferred, or these metallic plugs $l$ might extend, if preferred, beyond either or both lateral faces of the magnet and be turned or dressed down in a manner well understood by skilled mechanics, so as to constitute a means of support and means for locating the magnet or parts designed to be attached thereto.

The parts are assembled as follows: The terminals 13 are secured in place by means of the nuts 15 15 and the binding action of the insulating-washers, sleeves 14, and hexagonal heads 12 at the inner ends of the terminal, the leaf-spring $s$ being located in position above the sheet of insulating material 23 and in binding contact with the right-hand terminal 13. The coil $y$, having its attached conducting coiled springs 9 9, index-needle $i$, and pivot-pins secured in place, is slipped over the core $x$, and then the latter is placed in position between the limbs of the core-support and secured by a screw passing through the screw-hole $v$. When the core-support and the core are turned in a lathe, the interior curvature of the limbs $n\ n$ is made accurately concentric with the exterior curvature of the core $x$, so that when said core is slipped into position it may be securely held frictionally and by a single screw, as shown, although an additional screw might be supplied in the opposite limb $n$, if preferred. I find in practice, however, that one screw is sufficient, in view of the integral nature of the core-support $q$ and of the accurate concentric relation of the core and interior faces of the limbs $n\ n$. The conducting-plug 21 having been first slipped into position and the free end of the lower conducting-spring 9 secured thereto, the lower pivot-pin rests in the jewel-bearing $z$. The sleeves 1 1 and their insulating-washers and bridge $a$ are united together and to the upper flanged portion of the core-support by the screw-studs 2 2. (See Fig. 6.) Proper connections are made between the upper coiled conducting-spring 9 and the movable abutment 8. The coil, core, and core-support and parts as thus assembled constitute the "movement" of the instrument, which, it will be noted, when once assembled at the factory will be very stable, owing to the compact and rigid nature of all of the supporting parts. This movement is then definitely located in position between the poles of the permanent magnet $m$ by inserting the lower ends of the screw-studs 2 2 in openings 4 4 in the soft metallic plugs in the upper faces of the adjoining poles of the magnet and with the limbs $n\ n$ in frictional contact with the free poles of the magnet, thus securely locating the parts with relation to each other. The resistance $r$ is now slipped into place, so that the spring 20 makes good electrical contact with the plug 21 and the metallic core 22 similar contact with the upwardly-bent portion of the yielding leaf-spring $s$, the insulating-core 24 in this instance extending through a hole or opening in the spring $s$ and into the accurately-turned depression $j$ in the bottom of the casing. The assembled parts—the movement and the magnet—are now slipped into position, so that the steady or centering pins $k\ k$ on the under surface of the magnet fit accurately in the holes $h\ h$ in the ledge $e$, the base of the movement or the lower end of the core-support extending into a corresponding accurately-turned depression $f$ in the base of the casing. When the parts were slipped into the casing, the conical-shaped end of the plug 6 entered between the upper ends of the double leaf-spring 10, making good electrical connection at that point with one of the terminals 13 13. The dial-plate $p$ is now placed above and to one side of the instrument, so that a plane passing through the slot in the edge of said plate and the center thereof will pass through the axial centers of the two sleeves 1 1, which support the bridge *a*, said plane being at right angles to a line passing through the terminals of the instrument. The plate is then moved laterally until the notch passes both of the sleeves. (See Fig. 6.) It is then rotated until it assumes its proper position, with its exterior surface concentric with the inner circle of the casing. It is then lowered into position, so that the two ledges are securely locked together. The lid or cover is then screwed into position until the internal ledge *d* comes into mechanical contact with the dial-plate *p*, firmly uniting or locking all of the parts of the entire instrument together within the casing, the dial-plate fitting accurately within the upper inner surface thereof.

It will be apparent, therefore, that by the arrangement of parts hereinbefore described and illustrated in the accompanying drawings I have produced an instrument in which there is a minimum number of detachable parts and that therefore the structure of the entire apparatus is materially cheapened. Such an arrangement also makes it possible to construct instruments of very small dimensions, which is important in connection with "pocket-voltmeters," it being essential that the parts of such instrument shall be as compact, as small, and as delicate as possible.

In Figs. 11, 12, 13, 15, and 17 I have illustrated the parts of the instrument as of actual size adapted for a pocket-voltmeter. It will be understood, therefore, that with such an instrument where stability of the parts is an absolute necessity I am enabled to interlock all of the operative parts of the instrument together through the agency of the instrumentalities hereinbefore described and illustrated in the accompanying drawings and to construct an instrument which may be quickly taken apart for inspection or repair.

Figure 3:
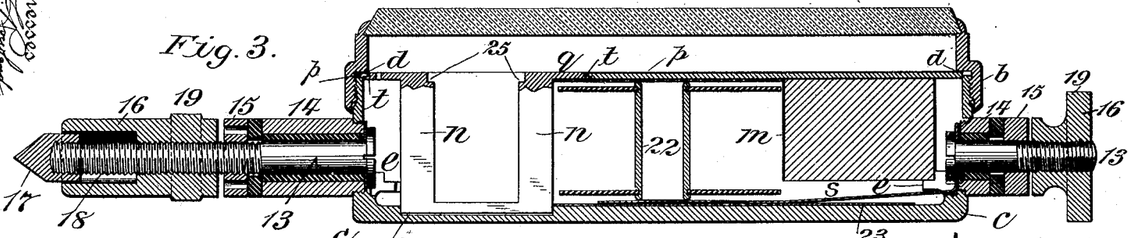
Fig. 3 is a sectional view similar to Fig. 1, illustrating a modified manner of supporting and clamping the operative parts of the instrument together within the casing.

In Fig. 3 of the drawings I have illustrated a slight modification as to the manner of causing the parts to be interlocked together within the casing. In this modified form the permanent magnet *m* rests upon an accurately-turned ledge *e*, which is the substantial equivalent of the ledge *e* in Fig. 2, but in this instance is turned concentric with the inner surface of the casing. The coil and core support is located in a depression *f* in the bottom of the casing, as before. The resistance-coil is provided with a metallic core 22, which rests directly upon the contact-spring *s*, and its upper end is insulated from the dial-plate; otherwise the structural arrangement is not substantially different from that disclosed in Fig. 2, except that of course in this instance the steady or centering pins are done away with in so far as they relate to the means for sustaining and locking the magnet in permanent connection with the casing. It will be understood, however, that the core-support *q* is secured to the permanent magnet in this modified form in the same manner as is disclosed in connection with the modified form shown in Fig. 2.

In Fig. 7 of the drawings I have shown a modified arrangement for supporting the bridge *a*. In this instance the lower ends of the screw-studs 2 2 are provided each with a head at one end and a nut at the other, adapted to firmly grip or secure the bridge into mechanical connection with the flange of the core-support, the sleeves 1 1 constituting spacing devices and each secured in a spaced recess, as before. The lower ends of the screw-studs 2 2 are secured to the soft-metal masses embedded in the poles of the magnet in the same manner as before described.

Although the numerous details of construction hereinbefore described, and illustrated in the accompanying drawings, have an especial adaptability or utility in connection with portable electrical measuring instruments, I do not limit their use to this particular form of apparatus, as obviously a number of the features hereinbefore described might be used generally in electrical measuring instruments, and some of them, notably the means of supporting the permanent magnet or attaching or securing any part or parts thereto by embedded soft-metal plugs and steady or centering pins either singly or combined, might be used generally in the arts where permanent magnets are utilized, and my claims in this respect are designed to be of the most generic scope. I believe it is also, broadly, new with me to secure the working parts of an electrical measuring instrument within a casing by the interlocking or binding action of the parts themselves and of the casing, and my claims in this respect are also designed to be of the most generic scope. An obvious means for securing the parts in the casing might be effected by a removable bottom instead of the removable lid or cover. Nor do I limit my invention in so far as the manner of supporting the movable element of the instrument is concerned to the specific type of electrical measuring instruments in which a movable coil constitutes such movable element for varying the position of the index-needle attached thereto, as obviously this same feature of my invention might be applied in connection with other types of electrical measuring instruments wherein the movable element is an iron or other magnetic armature and acted upon by a magnetic field located around or in close proximity thereto, the same being directed, broadly, to means for supporting the movable element in such manner that its pivot and jewel or other equivalent bearing-supports therefor shall always maintain a constant relation to each other and the magnetic field.

Having thus described my invention, what I claim, and desire to secure by Letters Patent of the United States, is—

1. An electrical measuring instrument embracing a "movement," a field-magnet for the movable element thereof and a surrounding casing provided with interlocking parts whereby the instrument is prevented from moving when in the casing, by the interlocking action of the parts and the casing, substantially as described.

2. An electrical measuring instrument provided with a series of detachable interlocking parts and a casing provided also with interlocking parts which receive and hold the parts of the instrument, the entire arrangement being such that the parts are held together and to the casing against movement by interlocking action, substantially as described.

3. An electrical measuring instrument provided with a series of detachable interlocking parts and a casing provided also with interlocking parts which receive and hold the parts of the instrument; in combination with a detachable lid or cover, the entire arrangement being such that the parts of the instrument are held together by the interlocking action of the same, the casing and the lid or cover, substantially as described.

4. A case for an electrical measuring instrument constructed in one integral piece having interlocking depressions in the interior thereof for receiving the parts of the instrument, substantially as described.

5. A case for an electrical measuring instrument constructed in one integral piece and having a ledge therein for supporting the instrument; together with interlocking depressions for receiving the parts of the instrument and locking them against movement, substantially as described.

6. An electrical measuring instrument having a dial-plate and interlocking means for detachably securing it to the instrument, substantially as described.

7. An electrical measuring instrument having a dial-plate provided with an opening and a slot at one edge and a locking-ledge on its under side, substantially as described.

8. A core-support for the magnetizable core of an electrical measuring instrument constructed of a single piece of metal having two limbs for securing the core in place and a flange at one end, substantially as described.

9. A core-support for the magnetizable core of an electrical measuring instrument having two downwardly-extending limbs integrally united together at one end and a flange integral with the other ends of said limbs, substantially as described.

10. A core-support for the magnetizable core of an electrical measuring instrument turned out of a single piece of non-magnetic metal so as to constitute supporting-limbs, the inner faces of which are concentric with the outer faces of the core when in position, substantially as described.

11. A core-support for the magnetizable core of an electrical measuring instrument, consisting of one integral piece having two limbs, the inner faces of which are concentric with the core when in position; an enlarged opening being turned out of the upper end of said core-support so as to admit of the insertion of the core and its surrounding coil in assembling the parts, substantially as described.

12. A "movement" for an electrical measuring instrument embracing a core-support constructed of one integral piece, a core supported thereby; a movable coil surrounding the core and pivoted at one end in that part of the core-support which joins the limbs thereof together; a bridge secured directly to the core-support, the other end of said coil being pivotally supported by the bridge, substantially as described.

13. In an electrical measuring instrument a core-support constructed of one integral piece having two limbs between which the core is secured; a coil surrounding said core-support and pivoted at one end directly in the support, two sleeves the ends of which are accurately fitted in spaced recesses in the support, a bridge secured to said sleeves and all so arranged that the axial line of the coil will always be maintained in the axial line of the core, substantially as described.

14. In an electrical measuring instrument a detachable "movement" embracing a coil and an index-needle attached thereto; pivots secured to the coil; a core surrounded by the coil; a core-support constructed in one integral piece, one end of said core being provided with a pivot-bearing for the pivot of the coil; in combination with a detachable bridge or support provided with means for securing it to the core-support, said bridge being provided with a pivot-bearing for the remaining pivot of the coil, substantially as described.

15. An electrical measuring instrument provided with a permanent field-magnet; a magnetizable core; a movable coil and a support for the coil and the core; said support being of non-magnetic material and detachably secured between the free poles of the magnet and in frictional contact therewith, substantially as described.

16. An electrical measuring instrument provided with a permanent field-magnet; a magnetizable core; a movable coil and a support for the coil and the core; together with means for frictionally securing the support directly to the field-magnet, said support also having frictional bearing between the free ends of the field-magnet poles whereby the parts are held together by interlocking action, substantially as described.

17. A permanent magnet for an electrical measuring instrument provided with one or more relatively soft masses embedded in the body thereof, substantially as described.

18. A permanent magnet for an electrical measuring instrument provided with relatively soft masses embedded in the body thereof and steady or centering pins secured in said soft masses, substantially as described.

19. An electrical measuring instrument having a permanent field-magnet provided with relatively soft masses embedded therein near the free poles thereof; in combination with a detachable "movement" provided with means for securing it to said soft masses, substantially as described.

20. An electrical measuring instrument provided with a permanent field-magnet having relatively soft masses embedded in the faces thereof near the poles; in combination with a movable element secured between the poles of said field-magnet and to said soft masses; together with means for securing the instrument to the casing through additional soft masses embedded in the body of the magnet, substantially as described.

21. An electrical measuring instrument provided with a permanent field-magnet having relatively soft masses embedded in one face thereof and steady or centering pins secured in said soft masses; in combination with a casing provided with openings adapted to receive said steady or centering pins in such manner that the magnet is prevented from moving within the casing, substantially as described.

22. An electrical measuring instrument provided with a terminal and a binding-screw therefor; in combination with a sharp-pointed terminal and a pocket in the free end of the binding-screw whereby the pointed terminal may be protected when the binding-screw is removed to its extreme outer limit, substantially as described.

23. An electrical measuring instrument having a permanent field-magnet with the poles thereof facing each other and cut away in arcs of a circle; in combination with a detachable "movement" having a non-magnetic support which rests frictionally against the opposing poles and is provided with a flange and means for securing said flange frictionally to the upper face of the magnet, substantially as described.

24. An electrical measuring instrument provided with a permanent field-magnet having its poles cut away in arcs of a circle; in combination with a magnetizable core and movable coil sustained by a non-magnetic support resting frictionally against the extended ends of the field-magnet poles, said support being provided with a flange and means for securing it to the upper face of the field-magnet, substantially as described.

In testimony whereof I have signed my name to this specification in the presence of two subscribing witnesses.

EDWARD WESTON.

Witnesses:
C. J. KINTNER,
M. H. YAWGER.